(12) United States Patent
Wedding et al.

(10) Patent No.: US 8,536,985 B1
(45) Date of Patent: Sep. 17, 2013

(54) DATA ISOLATION

(75) Inventors: Daniel K. Wedding, Toledo, OH (US);
Carol A Wedding, Toledo, OH (US)

(73) Assignee: Imaging Systems Technology, Inc., Toledo, OH (US)

( * ) Notice: Subject to any disclaimer, the term of this patent is extended or adjusted under 35 U.S.C. 154(b) by 2493 days.

(21) Appl. No.: 11/168,503

(22) Filed: Jun. 29, 2005

Related U.S. Application Data

(63) Continuation-in-part of application No. 10/193,255, filed on Jul. 12, 2002, now Pat. No. 6,967,414.

(60) Provisional application No. 60/308,457, filed on Jul. 30, 2001, provisional application No. 60/308,318, filed on Jul. 30, 2001.

(51) Int. Cl.
*G05B 11/01* (2006.01)
*H04B 3/54* (2006.01)

(52) U.S. Cl.
CPC .................................... *H04B 3/542* (2013.01)
USPC ........................... 340/12.34; 370/488; 701/50

(58) Field of Classification Search
USPC ........... 701/50; 340/12.34, 310.13; 370/290, 370/291, 488, 501
See application file for complete search history.

(56) References Cited

U.S. PATENT DOCUMENTS

| | | |
|---|---|---|
| 4,104,630 A | 8/1978 | Chasek |
| 4,270,808 A | 6/1981 | Brearley |
| 4,300,126 A | 11/1981 | Gajjar |
| 4,780,618 A | 10/1988 | Wareman et al. |
| 4,926,158 A | 5/1990 | Zeigler |
| 5,025,253 A | 6/1991 | DiLullo et al. |
| 5,142,278 A * | 8/1992 | Moallemi et al. ............. 340/436 |
| 5,278,862 A | 1/1994 | Vander May |
| 5,339,069 A | 8/1994 | Penner et al. |
| 5,397,924 A | 3/1995 | Gee et al. |
| 5,442,810 A | 8/1995 | Jenquin |
| 5,488,352 A | 1/1996 | Jasper |
| 5,491,463 A | 2/1996 | Sargeant et al. |
| 5,528,217 A | 6/1996 | Adams |
| 5,677,667 A | 10/1997 | Lesesky et al. |
| 5,716,071 A | 2/1998 | Stanley et al. |
| 5,739,592 A * | 4/1998 | Rigsby et al. ................. 307/9.1 |
| 5,798,577 A | 8/1998 | Lesesky et al. |
| 5,825,287 A | 10/1998 | Zarybnicky, Sr. et al. |
| 5,900,803 A | 5/1999 | Politz et al. |
| 5,917,632 A | 6/1999 | Lesesky |
| 5,920,128 A | 7/1999 | Hines |
| 5,994,998 A | 11/1999 | Fisher et al. |

(Continued)

OTHER PUBLICATIONS

Louis Tijerina and Shannon Hetrick, Analytical Evaluation of the Effectiveness of Minimum Separation Distance and Turn-Signal Onset Rules for Lane Change Crash Avoidance System Warning Onset.

(Continued)

*Primary Examiner* — Helal A Algahaim
(74) *Attorney, Agent, or Firm* — Donald K. Wedding (57) ABSTRACT

There is disclosed a system, method, and apparatus for a truck or like vehicle wherein a power source is split and/or divided into a plurality of branch power lines and wherein there is data and power transmitted over the power lines to selected systems and/or subsystems. An intelligent isolation module is provided for selectively transmitting, blocking, and/or altering data and/or power on any branch, sub-branch, and/or selected segment of a branch.

25 Claims, 10 Drawing Sheets

(56) References Cited

U.S. PATENT DOCUMENTS

| | | | |
|---|---|---|---|
| 6,025,563 | A | 2/2000 | Lesesky et al. |
| 6,028,537 | A | 2/2000 | Suman et al. |
| 6,064,299 | A | 5/2000 | Lesesky et al. |
| 6,089,588 | A | 7/2000 | Lesesky et al. |
| 6,111,524 | A | 8/2000 | Lesesky et al. |
| 6,127,939 | A | 10/2000 | Lesesky et al. |
| 6,130,487 | A * | 10/2000 | Bertalan et al. ............ 307/9.1 |
| 6,140,911 | A | 10/2000 | Fisher et al. |
| 6,150,793 | A | 11/2000 | Lesesky et al. |
| 6,254,201 | B1 | 7/2001 | Lesesky et al. |
| 6,352,137 | B1 | 3/2002 | Stegall et al. |
| 6,378,959 | B2 | 4/2002 | Lesesky et al. |
| 6,411,203 | B1 | 6/2002 | Lesesky et al. |
| 6,411,206 | B1 | 6/2002 | Weant et al. |
| 6,496,377 | B1 | 12/2002 | Happ et al. |
| 6,501,375 | B1 | 12/2002 | Weant et al. |
| 6,522,515 | B1 | 2/2003 | Whitney |
| 6,545,593 | B2 * | 4/2003 | DeWilde ............ 340/538.12 |
| 6,582,033 | B2 | 6/2003 | Lesesky et al. |
| 6,597,282 | B2 | 7/2003 | Takata et al. |
| 6,604,038 | B1 | 8/2003 | Lesesky et al. |
| 6,608,554 | B2 | 8/2003 | Lesesky et al. |
| 6,744,352 | B2 | 6/2004 | Lesesky et al. |
| 6,753,771 | B2 | 6/2004 | Lesesky |
| 6,756,912 | B2 | 6/2004 | Skiver et al. |
| 6,799,814 | B2 | 10/2004 | Lesesky et al. |
| 6,946,953 | B2 | 9/2005 | Lesesky et al. |
| 6,967,414 | B1 | 11/2005 | Wedding et al. |
| 6,977,578 | B2 * | 12/2005 | Kline ............ 370/501 |
| 7,009,527 | B2 * | 3/2006 | Seo ............ 340/12.31 |
| 7,015,800 | B2 | 3/2006 | Lesesky et al. |
| 7,040,435 | B1 | 5/2006 | Lesesky et al. |
| 7,059,689 | B2 | 6/2006 | Lesesky et al. |
| 7,102,494 | B2 | 9/2006 | Lesesky et al. |
| 7,117,075 | B1 | 10/2006 | Larschan et al. |
| 7,176,786 | B2 * | 2/2007 | Kline et al. ............ 370/488 |
| 7,272,519 | B2 | 9/2007 | Lesesky et al. |
| 7,280,898 | B2 | 10/2007 | Lesesky et al. |
| 7,434,643 | B2 | 10/2008 | Lesesky et al. |
| 7,449,993 | B2 | 11/2008 | Lesesky et al. |
| 7,497,529 | B2 | 3/2009 | Lesesky et al. |
| 7,583,901 | B2 * | 9/2009 | Nakagawa et al. ............ 398/183 |
| 7,852,207 | B2 * | 12/2010 | Berkman et al. ......... 340/538.16 |
| 2001/0045888 | A1 * | 11/2001 | Kline ............ 340/310.01 |
| 2002/0070041 | A1 * | 6/2002 | DeWilde ............ 174/36 |
| 2004/0239520 | A1 * | 12/2004 | Seo ............ 340/825.71 |
| 2005/0007241 | A1 * | 1/2005 | Kline et al. ............ 340/310.01 |

OTHER PUBLICATIONS

Louis Tijerina, A Taxonomical Analysis of Crash Contributing Factors and Prospects for ITS Crash Countermeasures.

Barry H. Kantowitz et al., Simulator Evaluation of Heavy-Vehicle Driver Workload: II: Complex Secondary Tasks.

Louis Tijerina et al., Use of Workload Assessment Measures and Methods to Assess Saftey-Relevent Impacts of In-Vehicle Device Use Among Heavy Vehicle Drivers.

Louis Tijerina et al., Driving Simulator Tests of Lane Departure Collision Avoidance Systems.

Elizabeth N. Mazzae et al., Development of Performance Specifications for Collision Avoidance Systems for Lane Change, Merging, and BackingTask 3—Human Factors Assessment of Driver interfaces of Existing Collision Avoidance Systems, DOT, Apr. 1996.

Elizabeth N. Mazzae et al., Human Factors Evaluation of Existing Side Collision Avoidance Systtem Driver Interfaces, International Truck & Bus Meeting and Expositior, Winston-Salem, North Carolina Nov. 13-15, 1995.

Scott A. Johnson et al., An Evaluation of Electronic Pedestrian Detection Systems for School Buses, International Congress & Exposition, Detroit, Michigan, Feb. 26-29, 1996.

* cited by examiner

DATA ISOLATION

RELATED APPLICATIONS

This is a continuation in part (CIP) under 35 USC 120 of U.S. patent application Ser. No. 10/193,255, filed Jul. 12, 2002 now U.S. Pat. No. 6,967,414 that claims priority under 35 USC 119(e) for Provisional Patent Application No. 60/308,457, filed Jul. 30, 2001 and Provisional Patent Application No. 60/308,318, filed Jul. 30, 2001.

BACKGROUND

1. Field of Invention

This invention relates to an electrical system, method, and apparatus for a truck or like vehicle for the splitting and transmitting of power and/or data to multiple systems and/or subsystems.

In a vehicle such as a truck, a single power source, such as a battery, drives a plurality of circuits through a plurality of fuses. These fuses are mounted in a container whose name will vary depending on the region of the country; some common names for the fuse container are fuse box, fuse block, and circuit breaker box. In a truck these plurality of circuits are used to power both the tractor and trailer(s). The trailer needs power for marker lights, brake lights, and various other systems. Each one of these branch lines, or circuits, on a trailer is identified by a unique color. The standard configuration is as follows:

| | |
|---|---|
| White | Ground return for all circuits on the towed vehicle |
| Black | Power for the clearance, side marker & license plate lamps |
| Yellow | Power for the left hand turn signal & hazard signal lamps |
| Red | Power for the stopping lamps and anti-lock devices |
| Green | Power for the right hand turn signal & hazard signal lamps |
| Brown | Power for the tail, clearance, side marker, and identification lamps |
| Blue | Power for auxiliary |

One colored line and the white line (or ground return) line make up one circuit, so these seven lines make up six circuits. These six power lines and one ground line originating from the tractor are connected to the trailer through an industry standard SAE J560 (seven pin) connector reference Surface Vehicle Standard SAE J560 Specification, Society of Automotive Engineers, Inc., June 1993. The primary purpose of these lines is to deliver power. However, in the past few years they have also been used to transmit data. An example of this is the anti-lock braking system (ABS).

For purposes of this disclosure, any device or system that transmits and/or receives data over the power lines, singularly or in combination, are herein referred to as Power System Communication Device(s) (PSCD). Furthermore, PSCD may be factory installed or retrofitted into the system in an after market installation. Some examples of PSCD's include, but are not limited too, collision avoidance data, anti-lock braking data, temperature sensors, and tire pressure sensors.

In professional trucking applications, power system communication is desirable because the existing wire harness may be used and dedicated cables do not have to be routed throughout the vehicle. This is of particular concern if communication is required between systems on the trailer and systems in the tractor. In practice, most tractors are hitched to many different trailers. The standard SAE J560 (seven pin) connector serves to standardize the power connection and thus allows any tractor to be paired with any trailer.

Currently there is no provision for a standard data connection between the tractor and the trailer. It is not desirable to run "rogue" data connections between the tractor and the trailer because tractors and trailers would no longer be universally compatible. Because no standard exists, data connectors might be routed in different physical locations, have different connector types, or even different pin assignments. To maintain the universal compatibility between tractors and trailers it is highly desirable to use the existing power system for communication.

Power system communication is also desirable in other articulated vehicle applications (including but not limited too, boat trailers, campers, or car trailers, and other like towing applications) when communication is desired between a lead vehicle and a vehicle in tow. Although universal compatibility is not paramount in these other applications, it is still desirable to eliminate additional wires and connections if at all possible. By using the power bus for communication, the elimination of extra wires is achieved.

This invention allows the selection of any PSCD even when identical PSCD's are installed on multiple trailers. It allows for the use of multiple communication protocols among the different PSCDs sharing the same power lines. Furthermore, it allows a data signal to be routed from one branch circuit to another. This is accomplished while still adhering to the SAE J560 standard. This invention also adheres to Safety Standard 121 that requires an anti-lock brake communication signal between the tractor and trailer.

2. Related Prior Art

The following prior art is incorporated by reference.

| U.S. Pat. No. | Inventor |
|---|---|
| 3,842,397 | Sindle |
| 3,944,981 | Akita et al |
| 3,975,708 | Lusk et al |
| 4,015,232 | Sindle |
| 4,278,962 | Lin |
| 4,349,823 | Tagami et al |
| 4,626,849 | Sims |
| 4,714,912 | Roberts et al |
| 4,801,938 | Holmes |
| 5,528,217 | Adams |
| 5,734,357 | Matsumoto et al |
| 6,127,939 | Lesesky et al |
| 6,545,593 | DeWilde |

Also incorporated by reference is Surface Vehicle Standard SAE J560 Specification, Society of Automotive Engineers Inc., June 1993.

SUMMARY OF THE INVENTION

This invention relates to an electrical system, method, and apparatus for a truck or like vehicle wherein a power source is split or divided into a plurality of branch power lines to transmit power and/or data to a variety of systems and/or subsystems in the vehicle. In the practice of this invention, the power system is used to transmit data as well as power. Furthermore, the power system can be electrically attached to one or more trailers by way of industry standard J560 connectors and accompanying coil cable(s).

In an electrical system for a truck or like vehicle containing one or more power lines, data is transmitted on one or more power lines of the vehicle to communicate with specialty devices that communicate over the power line. In accordance with this invention, an intelligent isolation module is incorporated in at least one power line that is carrying data, to isolate one segment of the power line from another segment of the same power line, and the isolation module also acting as a bi-directional gate between the isolated power line segments with the capability to alter its operational parameters by a set of commands. As used herein, incorporated includes insertion, integrated, attached, appended, connected, combined, and/or any other means of installation known in the art.

This intelligent isolation module is beneficial because it reduces the need for complex software protocols to select individual PSCDs while deselecting other PSCDs and thus increases the amount of useful data that can be transmitted. This invention also allows multiple circuits to be used independently and thus increasing the number of PSCDs that can be installed.

The insertion and/or incorporation of the intelligent isolation module separates the power line into two isolated data segments separated by the data filter contained within the isolation module while allowing power to continue down the line. These two isolated data segments that are on either side of the data filter are referred herein as sub-nets.

For purposes of this disclosure, the term "sub-net" refers to a section of a power line that has the ability to transmit and receive unique data on it and that is independent of the data being transmitted and received on a separate power line and/or a different section of the same power line.

The sub-nets on either side of the intelligent isolation module are referred herein to as sub-net 1 and sub-net 2. It is obvious to one skilled in the art that the addition of multiple intelligent isolation modules will result in many more sub-nets, i.e. sub-net 3, sub-net 4, sub-net 5, etc. In the interest of simplicity, this disclosure describes one intelligent isolation module on one branch power line and uses the terms sub-net 1 and sub-net 2. This is not intended to limit the practice of this invention to two sub-nets. It is contemplated that additional intelligent isolation modules may be incorporated in the system so as to provide more than two sub-nets.

In accordance with this invention, the intelligent isolation module can perform a series of tasks that are used singularly or in combination to achieve the desired results. The intelligent isolation module blocks data on sub-net 1 from continuing on to sub-net 2 and/or blocks data on sub-net 2 from continuing on to sub-net 1. The intelligent isolation module has the ability to alter data on sub-net 1 and then allow the newly altered data to be placed on to sub-net 2 and/or alter data on sub-net 2 and then place the newly altered data on to sub-net 1. The intelligent isolation module allows that data on sub-net 1 to be passed to sub-net 2 in an unaltered form and/or allows data on sub-net 2 to be passed to sub-net 1 in an unaltered form. The intelligent isolation module can also disconnect power and prevent power from being transmitted down the remainder of the power line.

In one embodiment, the vehicle is comprised of a tractor only, and the individual circuits within the tractor are isolated. This embodiment allows PSCDs to be placed on different circuits in the tractor while preventing interference between PSCDs produced by different manufacturers. This embodiment can be used to sub-divide any one of the circuits in tractor to generate a series of sub-nets for data transmission.

In another embodiment, the vehicle is comprised of a tractor and one or more trailers sharing an electrical system for the transmission of power and the transmission of data. As in the case of the previous embodiment, this invention isolates the communications on any number of the circuits in the tractor. In addition, this embodiment isolates the communications between the tractor and each of the trailers connected to the tractor. This embodiment also provides for communications between the isolated circuits on the tractor and the trailer(s). Because the data is isolated between sub-nets, data can be passed from one sub-net to another with the data being unaltered, modified, or blocked entirely. This invention can also turn power off to all of the sub-nets that it feeds. The invention can also communicate with other instances of the invention for the exchange of information.

In one embodiment of this invention, the intelligent isolation module is incorporated into, onto, and/or in combination with an industry standard J560 connector at the front of each trailer. By selecting a standard location for the module, consistent hardware and software can be generated within trucking fleets.

In another embodiment of this invention, the intelligent isolation module is incorporated into a standard J-560 connector.

In another embodiment of this invention, the intelligent isolation module is incorporated into a standard coil cable that connects two J-560 connectors.

In the practice of this invention, the data filter portion of the intelligent isolation module isolates data on the power line attached to one side of the filter from the data on the power line attached to the opposite side of the filter while allowing power to be passed through the filter.

In the practice of this invention, the data filter portion of the intelligent isolation module can act as a power switch to allow power to be on one side of the filter and prevent power from being passed through the filter.

In the practice of this invention, the data filter power switch is controlled by the data control circuitry of the intelligent isolation module.

In one embodiment of this invention, one power line transmitter/receiver can switch between sub-net 1 and sub-net 2. In this embodiment, the data being transmitted/received on one sub-net is isolated from the data on the other sub-net.

In another embodiment of this invention, one power line transmitter has the capability to switch between the isolated line segments on each side of the filter and independently transmit data one side of the filter while not transmitting data on the opposite side of the filter.

In another embodiment of this invention, one power line transmitter has the capability to simultaneously transmit data both sides of the data filter.

In another embodiment of this invention, one power line receiver has the capability to switch between the isolated line segments on each side of the filter and independently receive data being transmitted on one side of the filter while not receiving data that is being transmitted on the opposite side of the filter.

In another embodiment of this invention, one power line receiver has the capability to simultaneously monitor and/or receive data both sides of the data filter.

In another embodiment of this invention, one power line transmitter/receiver is on sub-net 1 and a second power line transmitter/receiver is attached to sub-net 2. This allows the module to receive and/or transmit data simultaneously and/or independently on all of the isolated power line segments.

In another embodiment of this invention, one or more power line transmitters can access each side of the data filter such that different data can be transmitted simultaneously on all of the isolated line segments.

In another embodiment of this invention, one or more power line transmitters can access each side of the data filter such that the same data can be transmitted simultaneously on the isolated line segments.

In another embodiment of this invention, one or more power line receivers can access each side of the data filter such that different data can be received simultaneously on the isolated line segments.

In another embodiment of this invention, one or more power line receivers can access each side of the data filter such that the same data can be received simultaneously on the isolated line segments.

In another embodiment of this invention, there is one power line transmitter and one power line receiver on each side of the filter to allow data to be independently transmitted and/or received on each side of the filter.

In the practice of this invention, data control circuitry portion of the intelligent isolation module has the capability to receive data from the power line segment on one side of the data filter by way of one or more power line receivers and transmitters and pass unaltered data by way of one or more power line receivers and transmitters to the power line segment on the opposite side of the data filter.

In the practice of this invention, data control circuitry portion of the intelligent isolation module has the capability to receive data from the power line segment on one side of the data filter by way of one or more power line receivers and transmitters and pass altered data by way of one or more power line receivers and transmitters to the power line segment on the opposite side of the data filter.

In the practice of this invention, data control circuitry portion of the intelligent isolation module has the capability to receive data from the power line segment on one side of the data filter by way of one or more power line receivers and transmitters and not pass data to the power line segment on the opposite side of the data filter.

In the practice of this invention, data control circuitry portion of the intelligent isolation module has the capability to control the data filter so said data filter acts like a power switch by blocking power from passing through said filter.

In the practice of this invention, wherein data control circuitry portion of the intelligent isolation module has the capability to be programmed with a set of instructions so that the data transmitted on one or both sides of the intelligent isolation module can determine how the module behaves.

In the practice of this invention, data control circuitry portion of the intelligent isolation module has one or more bi-directional outputs designed to transmit and/or receive data to and from other intelligent isolation modules and/or devices that are not PSCD's.

In one embodiment of this invention, the intelligent isolation module is incorporated into a standard J-560 connector.

In one embodiment of this invention, the intelligent isolation module is incorporated into a standard coil cable that connects two J-560 connectors.

In one embodiment of this invention, the intelligent isolation module is a stand alone item that can be inserted at any location along a power line in the cab and/or trailer(s) in order to increase the number of isolated data line segments on one power line.

In one embodiment of this invention, the intelligent isolation module is a stand alone item that can be inserted in many locations along one or more wires in the cab and/or trailer(s) in order to increase the number of isolated data line segments on one power line.

DESCRIPTION OF THE SEVERAL VIEWS OF THE DRAWINGS

FIG. 2 demonstrates how a single power source is separated into multiple branch lines, or circuits, at the fuse block. It illustrates how the introduction of filters will isolate the data from all other branch lines or circuits and thus increasing the number of usable data lines within the tractor and thus to the trailers. For purposes of this disclosure, the term "data filter" refers to one or more inductors, resistors, capacitors, transistors, and/or any combination of like parts known in the art with the purpose of filtering the data communications while passing power through said filter. The data filter may also have the capability to cut the power flowing through it.

FIG. 8 shows the embodiment of FIG. 7 connected to an industry standard J560 connector. The combination of the module of FIG. 7 and an industry standard J560 is referred to herein as a "SMART560". This is only one of many locations in the system that the module shown in FIG. 7 can be inserted. Although the invention of FIG. 7 is shown incorporated to and with a J560, it should not be construed to mean this is the only configuration. The invention of FIG. 7 could just as easily be incorporated into the coil cord herein referred to as a "SMARTCOIL".

DETAILED DESCRIPTION

Figure 1:
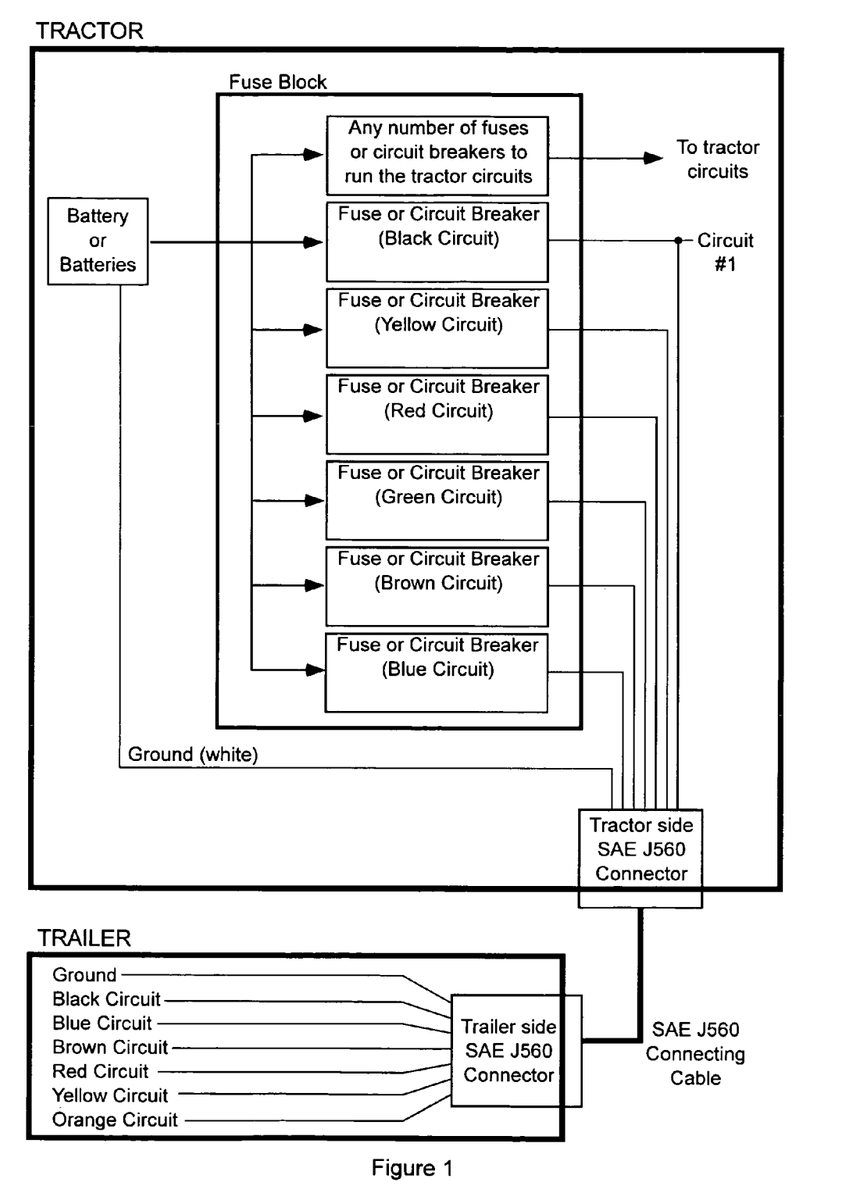
FIG. 1 shows a block diagram of a generic tractor, or like vehicle, connected to a trailer or like vehicle, with two industry-standard J560 connectors and a coil cord. This diagram demonstrates how a single power source is separated into multiple branch lines, or circuits, at the fuse block (or circuit breaker, or fuse box). It also demonstrates how the communications on any branch line, or circuit, can be transmitted over all other lines, or circuits because the lines are tied together at the battery.

FIG. 1 shows a block diagram of a standard truck connected to a standard trailer using an industry standard SAE J560 connector. In this diagram, a battery on the tractor feeds a fuse box where fuses protect each power line in a tractor. Power lines that are fed to the trailer are done so through an industry standard J560 connection. This connection is made through a standard J560 connector, a flexible cable often referred to as a "coil cable", and a second J560 connector. The J560 standard uses six colored circuits to identify the circuits and a white ground wire to feed power from the tractor to the trailer. If a fuse is not broken, the fuse acts like a direct connection passing both power and power line communications from one side of the fuse box to the other. When a PSCD is attached to any of these six circuits, the data is passed through the fuse protecting the circuit and then back down all of the other circuits on the system. In this FIG. 1, the black circuit is used for communications, and is labeled Circuit 1. The data on Circuit 1 passes through the fuse on the black circuit and is passed down all other circuits (yellow, red, green brown, and blue) in the system. Thus, the data on the black circuit can be detected on any other circuit. The common connection to the battery prevents all of the other circuits from being used independently of each other.

Figure 2:
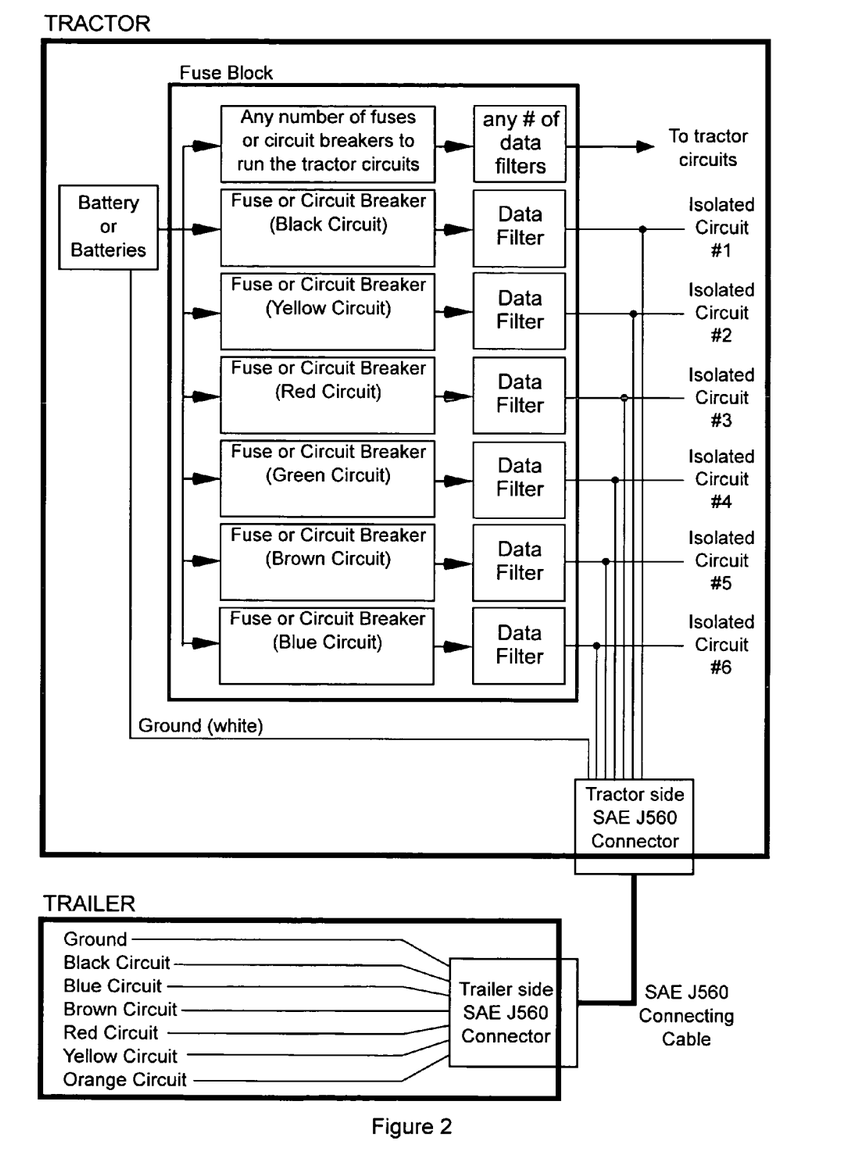
FIG. 2 shows a block diagram of a generic tractor, or like vehicle, connected to a trailer or like vehicle, with two industry standard J560 connectors and a connecting cable, sometimes called a coil cord.

FIG. 2 demonstrates the addition of a data filter in each power line leading to the trailer at the fuse box. This isolates the branch circuits from noise on the system generated by the other circuits in the tractor (i.e., televisions, microwave ovens, radios, etc). This also allows each circuit to act independently and prevents communications on one color circuit from interfering with the communications on a different color circuit. This filtration is accomplished while still allowing the power to be passed through unaffected. This isolation of the communications used on the circuits increases the amount of data that can be transmitted within the tractor by more than 600% by increasing the number of useful communication lines from one to six. With fewer devices on each line, the communications protocols can be simplified, further increasing the speed.

Figure 3:
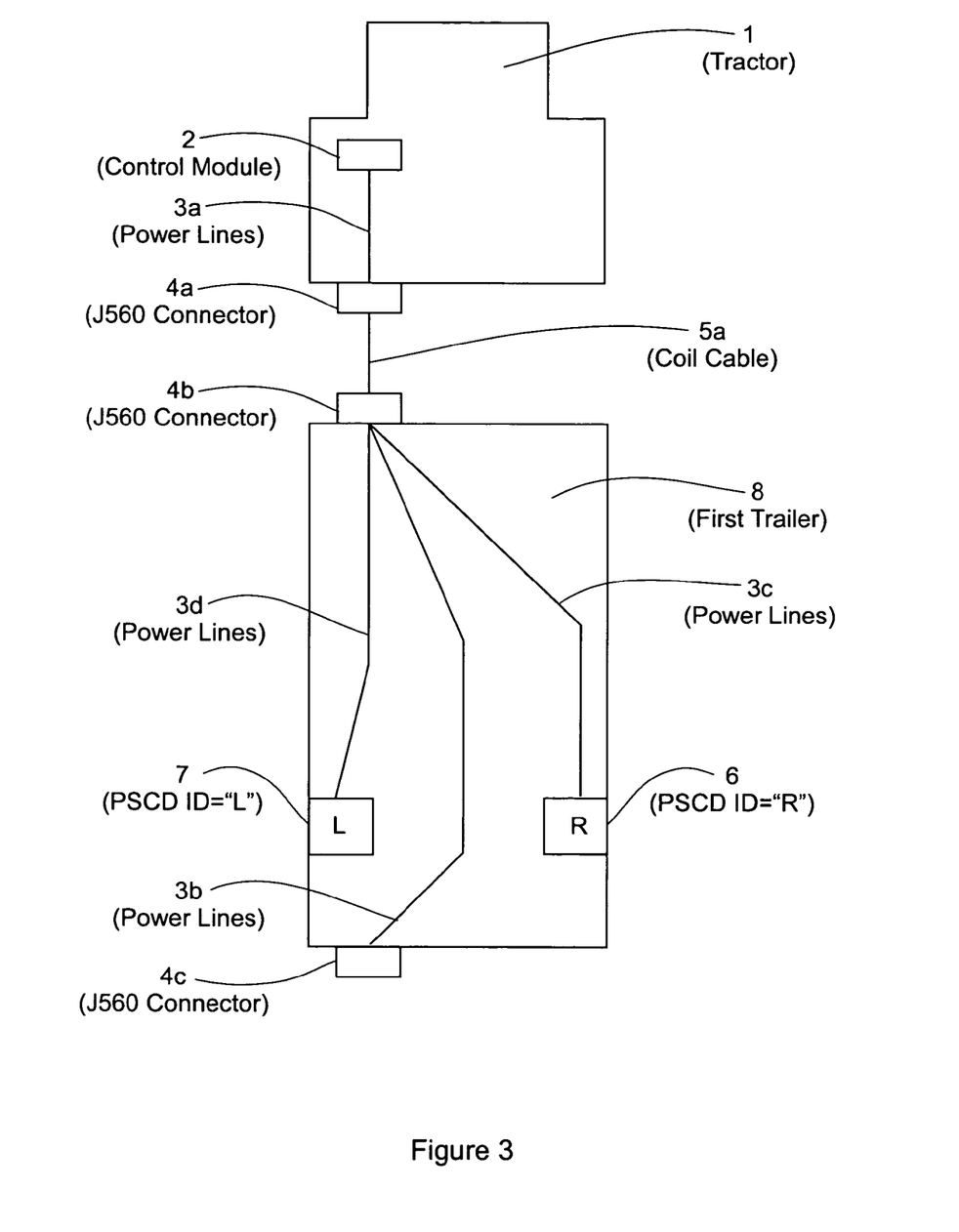
FIG. 3 shows a tractor connected to a trailer using industry-standard J560 connectors with a power system communication device (PSCD) that will report the tire pressure over the power lines.

FIG. 3 is used to illustrate the current technology that is in use by the trucking industry. FIG. 3 shows a standard tractor (1) connected to a first trailer (8) in tow using two industry standard J560 connectors (4 *a*) and (4 *b*). The J560 connectors (4 *a*) and (4 *b*) are electrically tied together with cable commonly referred to as a "coil cable" (5 *a*). Trailer (8) has a rear J560 connector (4 *c*) that is electrically tied or connected to the power lines (3 *b*) on the trailer (8) and tractor (1). The power lines (3 *a*-3 *d*) comprise a single shared or common electrical circuit for transmitting power and data. The other power lines passed to the trailer are not shown here. This J560 (4 *c*) is installed at the rear of the trailer (8) to allow one or more additional trailers to be connected in tow to the back of trailer (8). In FIG. 3, the tractor (1) is equipped with a control module (2) used to communicate with PSCDs (6) and (7) over the power lines (3 *a*-3 *d*). If the vehicle operator wishes to know the pressure of the right rear tire of the trailer (8), a command signal is sent from the control module (2) to the trailer, such as "?PR" representing "Question" "Pressure" "Right" over the power lines (3 *a*-3 *d*). This command is sent via the power lines (3 *a*-3 *d*) and is received by both tire pressure sensors PSCDs (6) and (7) on trailer (8). Because each of these sensors has a unique ID code, L for the left side sensor (6) and R for the right side sensor (7), only the right PSCD tire pressure sensor (7) will reply. The right side sensor (7) would respond over one of the power lines (3 *a*-3 *d*) with its answer, such as "98" representing "98 psi". The pressure control module (2) connected to the same power lines (3 *a*-3 *d*) would record and display the information to the vehicle operator (not shown).

Figure 4:
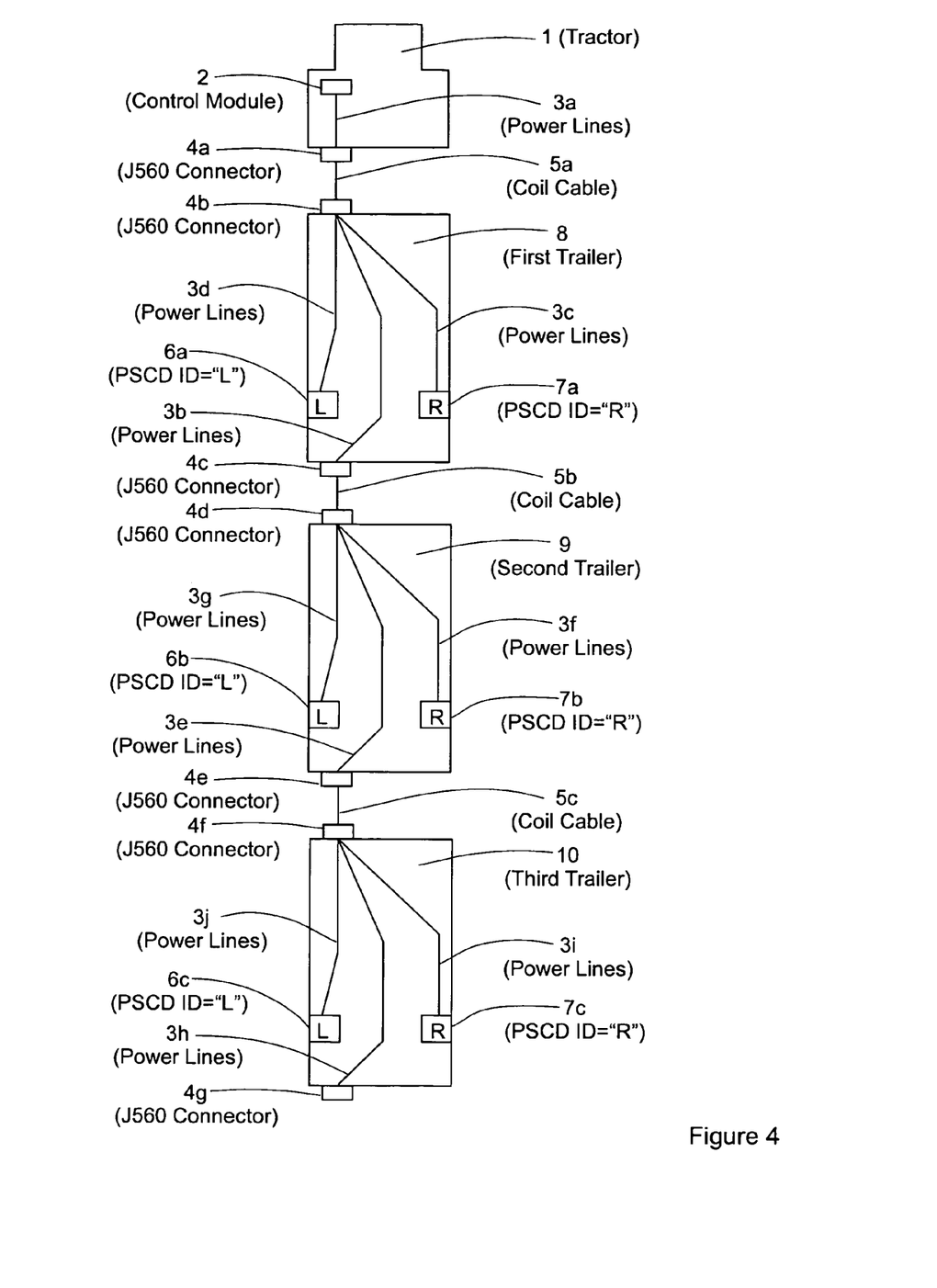
FIG. 4 shows a tractor connected to three trailers using industry standard J560 connectors with a tire pressure sensor system that communicates over the power lines. This shows how multiple sensors will generate problems if they have common ID codes. This illustrates the prior art problem and the need for the invention described herein.

FIG. 4 demonstrates a problem encountered by the industry when using the current technology. This figure shows a diagram of a standard tractor (1) connected to three standard trailers (8), (9), and (10) using industry standard J560 connectors (4 *a*-4 *g*). The J560 connectors are electrically tied together with "coil cables" (5 *a*-5 *c*). In FIG. 4, the tractor is equipped with a control module (2) to determine the PSCD tire pressure monitoring sensors (6 *a*-6 *c*) and (7 *a*-7 *c*) over the power lines (3 *a*-3 *j*). A communications problem occurs if the control module (2) wishes to obtain the pressure on the second trailer (9) on the right side PSCD (7 *b*). As in the previous example the monitor sends a simple command signal to the trailer, such as "?PR" representing "Question" "Pressure" "Right". This command signal sent via the power lines (3 *a*-3 *j*) is received by all three left tire pressure sensors (6 *a*-6 *c*) and all three right tire sensor (7 *a*-7 *c*). Again, the three left side sensors (6 *a*-6 *c*) ignore the command, but the three right side sensors (7 *a*-7 *c*) try to respond at the same time. This will cause the response data being sent back to the monitoring device (2) to be corrupted.

Figure 5:
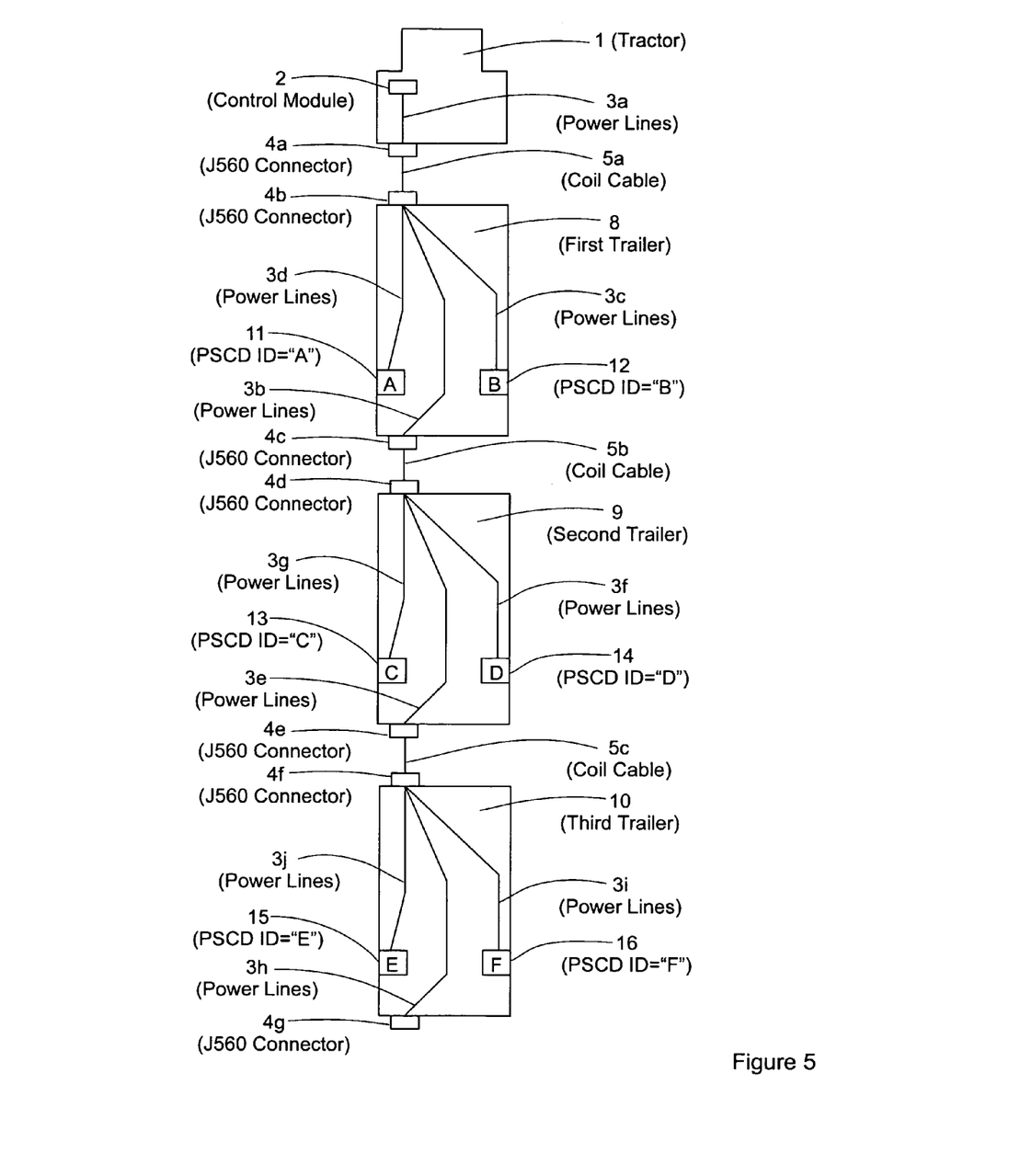
FIG. 5 shows an embodiment to avoid conflict and/or interference between competing data on common or shared electrical circuits for multiple trailers by the reprogramming of all of the sensors on all of the trailers so the sensors have unique ID codes. This solution leads to its own set of problems.

FIG. 5 shows a simple method to avoid conflict between the PSCDs on multiple trailers. To avoid conflict and corruption of data, as shown in FIG. 4, each sensor is given its own unique identification (ID) code. In this example, the PSCD tire sensors (11), (12), (13), (14), (15), and (16) are respectively assigned ID values of A-F. If the control module (2) desires to know the tire pressure measured by sensor (14), the device (2) issues the command signal "?PD". Although this embodiment will work, it presents new problems that prevent its practical implementation. In order for this method to work, the trailers must always be connected in the same order and great care must be taken to avoid two trailers with the same series of ID codes programmed into their PSCDs from being placed on the same tractor. When a broken sensor is replaced, it must be replaced with a new sensor with the same ID code. This will be impractical for large trucking fleets because tractors are continuously connected and disconnected from the trailers. It would be very difficult to keep track of the all of the PSCD ID's for all of the systems on all of the trailers in their fleet. The added time and expense for this method will prevent its practical implementation.

A variation on this solution would have the PSCD's ID codes reprogrammed each time a trailer is connected and/or reconnected to a tractor. However, this solution would require added tools and manpower to reprogram each sensor every time the trailers are disconnected and/or reconnected. This would also add delay and expense that large trucking fleets would not tolerate. This also poses the problem of potential legal liability, for example if a worker forgot to reprogram the PSCD's ID and this resulted in an accident.

Figure 6:
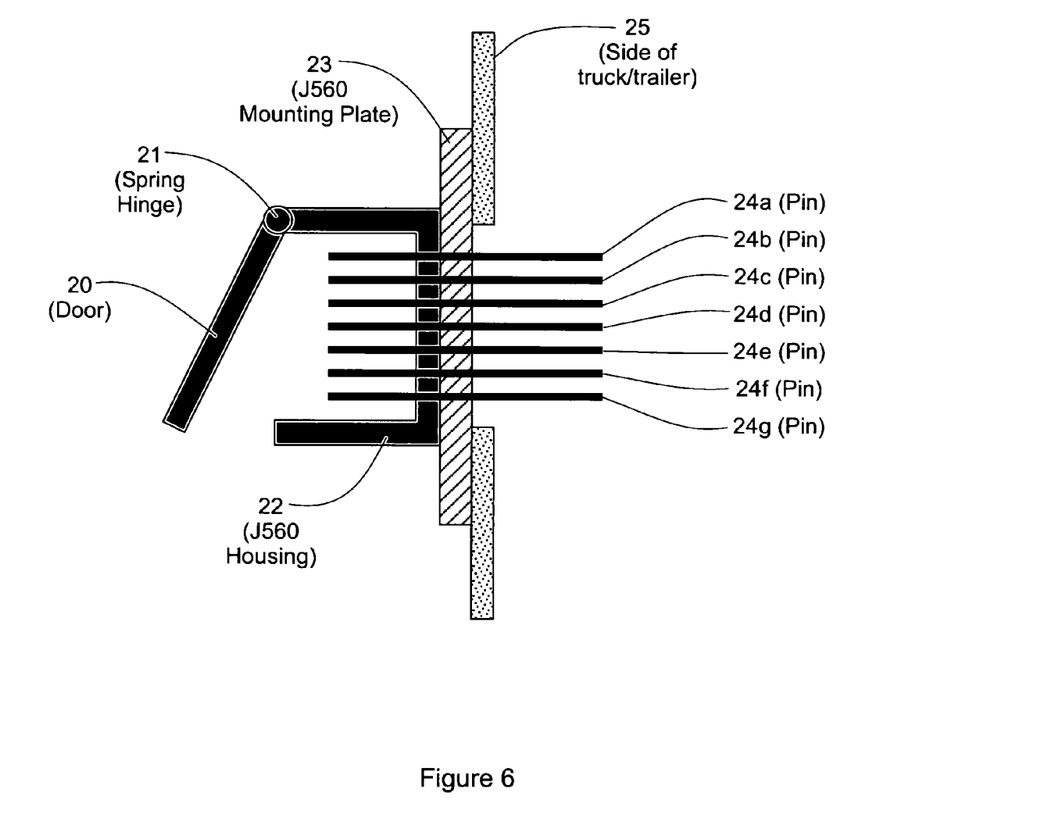
FIG. 6 shows a cross-section of an industry standard J560 connector.

FIG. 6 shows a standard J560 connector (4) that would normally be attached to the back of a tractor and to the front and back of a trailer. This demonstrates how both power and data are passed directly through the connector (4). When not in use, the J560 typically has a door (20) connected to the housing (22) by a spring loaded hinge (21) that forces the door closed when not in use. This door (20) prevents contaminants from getting inside of the connector. The housing (22) is connected to a mounting plate (23) that is used to bolt to the side of the vehicle (25), such as a tractor or trailer. Seven connecting pins made up of six power pins and one ground pin (24 *a* through 24 *g*) pass through the housing (22), mounting plate (23), and the side of the vehicle (25). Electrical connections (not shown) are typically made from inside the vehicle to the pins (24 *a* through 24 *g*). Power is fed to the J560 by a "coil cord" (5 *a*) as show in FIG. 3.

Figure 7:
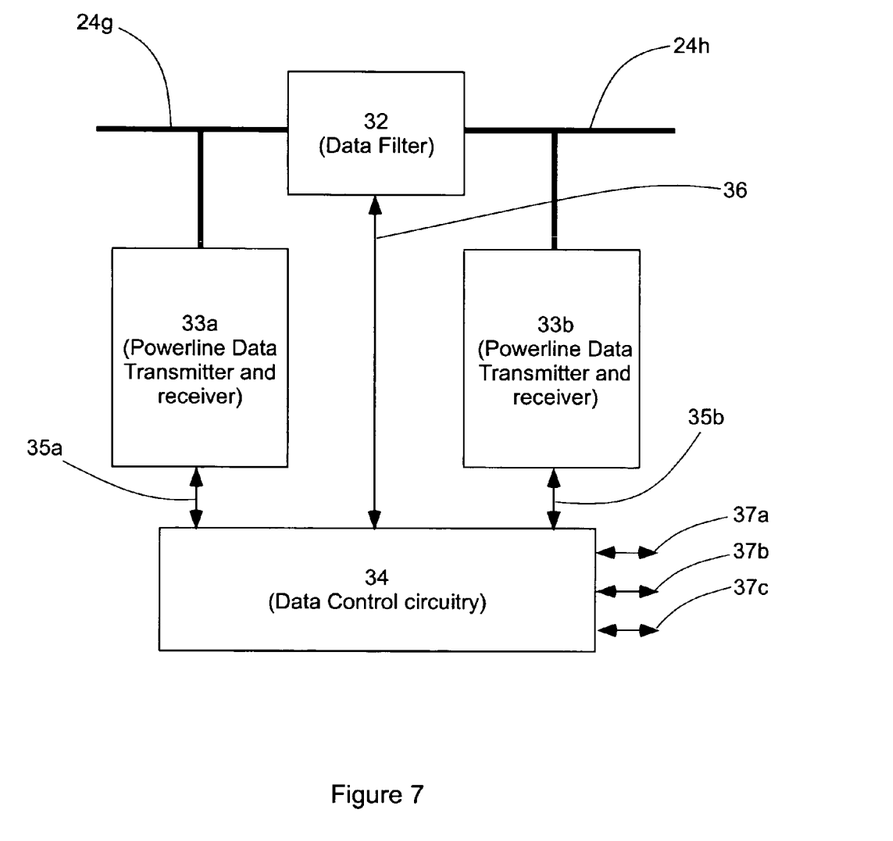
FIG. 7 is a block diagram illustrating a modular embodiment of this invention. In its best embodiment, this would be a module (herein referred to as a "SMARTMOD"). Any number of SMARTMODS could be inserted in the power system at any number of points to generate as many sub-nets as desired.

FIG. 7 shows a block diagram of one embodiment of this invention. The selection of a trailer is done by inserting this embodiment of the invention in series with the power line that is being used to transmit the data. The power and data are transmitted to the PSCD on one of the six power lines, such as (24 g). The data filter (32) on this line will allow the power to pass through it or block the power from passing through it depending on the state of the filter. The state of said filter is determined by a command that is sent to it by the bi-directional data bus (36). Data is blocked from passing through the data filter at all times. The data on the power line (24 g) is received and decoded by the power line data receiver and transmitter (33 a) and passed through a bi-directional data bus (35 a) to the data control circuitry (34). The data control circuitry (34) may take the form of a microprocessor, resistors, transistors, inductors, logic gates, and/or any other component known in the art. The purpose of this data control circuitry (34) is to evaluate the data and determine if it should alter, change, and/or combine none, some, or all of the data before it is passed on or blocking it completely. If the data is passed on, the control circuitry (34) may pass the data down any number of bi-directional or mono-directional buses. Data may be passed down any number of bi-directional buses shown here as (37 a-37 c) to one or more embodiments of this invention. The data may also be sent down the bi-directional data bus (35 b) to a second power line data transmitter and receiver (33 b). Data sent to (33 b) is then put out on the power line (24 h) that is receiving power from power line (24 g) through the data filter and power filter (32), if this filter is in the state to pass power. This data filter and power filter can be made of discrete components such as, but not limited to inductors, resistors, relays, capacitors, and/or any other like components alone or in combination known in the art. This data filter and power filter will effectively have a single power line (24 g and 24 h) that the power perceives as one continuous circuit that also has the ability to block the power from passing through the power filter. The data perceives this filter as two isolated circuits and all data must be passed through the data control circuitry (34).

Figure 8:
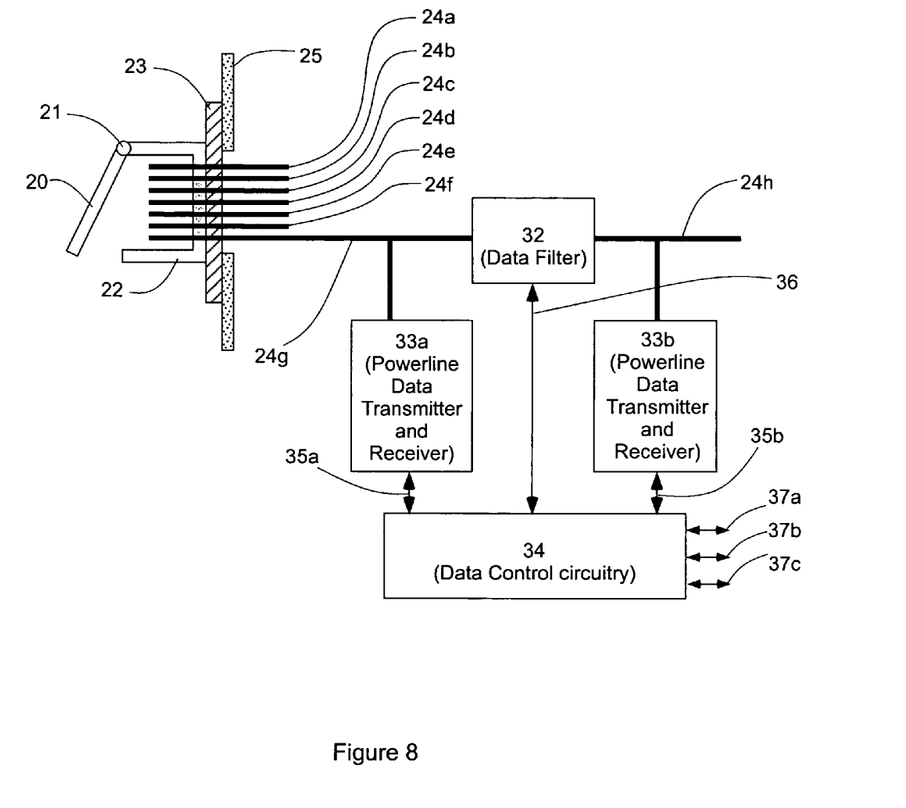

FIG. 8 shows another embodiment of this invention. In this embodiment, the J560 connector (4) attached to the front of the trailer in FIG. 6 is connected to, and combined with, the block diagram of FIG. 7 to create a further embodiment and practice of the invention (referred to hereafter as the "SMART560"). In this J560 connector (4), the power is passed through the J560 connector via power line (24 g) to the trailer. Once the data and power are inside of the J560, the power and data are passed through the invention as described in FIG. 7. The newly altered data and power are then passed to the PSCDs on the trailer. In this FIG. 7 only one of the pins of the J560 (24 g) has the module shown in FIG. 7 on to it. It is obvious that the embodiment as described in FIG. 7 could be inserted on any number of the pins (24 a through 24 g) of the J560. It is contemplated in the practice of this invention that the block diagram in FIG. 7 can be inserted in a number of places throughout the shared or common electrical system. For example, the invention as shown in FIG. 7 can be mounted directly into the coil cable (5) instead of the J560 (4). In the best embodiment, the invention is incorporated into the J560 connector (4) but not limited to the J560 connector.

Figure 9:
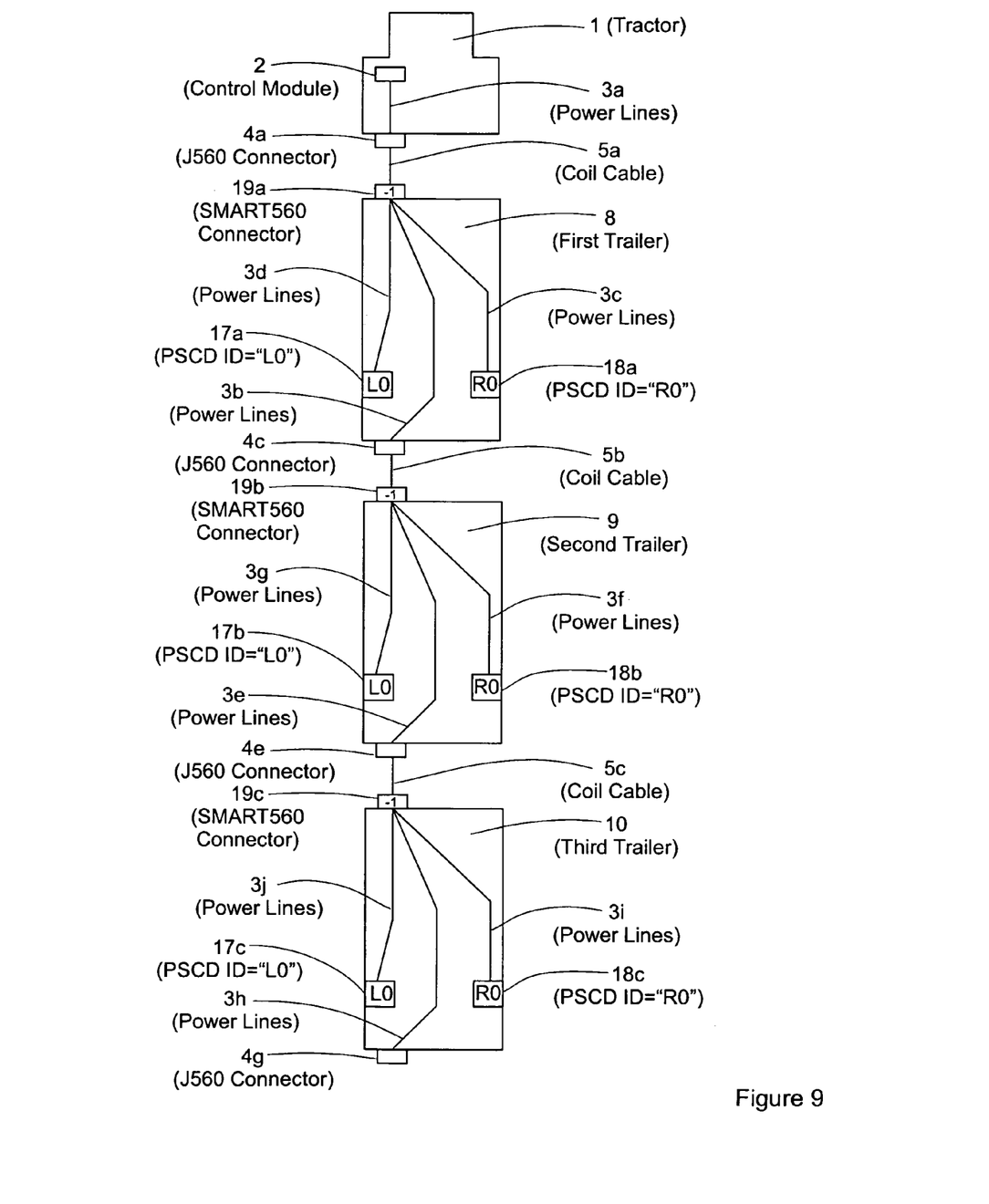
FIG. 9 shows the practice of the embodiment of FIG. 8 to select one of the PSCDs in a series of trailers, thus eliminating the problems described in FIG. 4 without having to individually reprogram each sensor as described in FIG. 5.

FIG. 9 shows one preferred embodiment for the practice of this invention. In this example the same tractor and trailer train as in FIG. 4 is equipped with both components of this invention. The tractor is equipped with the data filters in the tractor (not shown) and the trailers are equipped with the "SMART560" (19 a-19 c) on the front of trailers (8), (9), and (10) instead of standard SAE J560 connectors (4 b), (4 d), and (4 f). These SMART560 connectors (19 a-19 c) are programed to subtract 1 from the last byte of information in a four ASCII byte packet. In this embodiment all of the left side tire pressure sensors (17 a-17 c) have ID codes of L0 and the right side tire pressure sensors (18 a-18 c) have ID codes R0. Because all of the trailers have the same ID codes, the trailers do not need to be placed in a special sequence for this embodiment to work. There is also no need to reprogram the PSCD sensors every time the trucks are connected. In this example, if the control module (2) for the tire pressure-monitoring device is to receive the pressure of the right tire of the second trailer, it must send a command signal to the sensor (18 b) so it will take a reading and respond. The monitor (2) will send the command signal to the first trailer, such as "?PR2" representing "Question" "Pressure" "Right" "2nd trailer". This command is sent via the power line (3 a), to the J560 connector (4 a), to the coil cord (5 a) and finally is received by the SMART560 (19 a) mounted on the front of the first trailer (8). The SMART560 (19 a) intercepts the command and alters it to "?PR1" (subtracting one from the fourth ASCII byte of data). The first trailer's (8) PSCD sensors (17 a) and (18 a) receive the command "?PR1". The sensors on this trailer (8) do not respond because there are no sensors on the first trailer (8) that have the ID code "R1". The command "?PR1" is passed to the second trailer (9) through the power line (3 b), through the J560 connector (4 c), through the coil cord (5 b), and finally to the second SMART560 connector (19 b). The second SMART560 (19 b) subtracts one from the fourth ASCII byte of the command converting the it from "?PR1" to "?PR0". The second trailer's (9) sensors (17 b) and (18 b) receive the "?PR0" command. The last two ASCII bytes of data are in this command are "R0" and they match the ID code for the right side sensor (18 b) of the second trailer (9). The second trailer's (9) right side sensor (18 b) responds to the command with its answer, such as "98" representing a tire pressure of "98 psi" that would be passed forward to the trailer without any of the SMART560 connectors (19 a and 19 b) altering any of the data. For completeness, it should be noted that the command signal "?PR0" will be passed on to the third trailer (10) through, power line (3 e), to J560 connector (4 e), through coil cord (5 c) to the third SMART560 connector (19 c) that will alter the fourth ASCII byte of the command, thus converting the command "?PR0" to "?PR/" and pass it to the third trailer (10). The third trailer would also not respond because the last two ASCII bytes of data of the command "R/" do not match any PSCD sensor IDs on this trailer.

In one embodiment presently contemplated for the practice of this invention, the system shown in FIG. 7 is attached to the power lines and incorporated into or attached to a standard J560 connector as shown in FIG. 6. By incorporating the second component of this invention into or next to the J560 connector, the invention cannot be separated from the trailer (or vehicle in tow) as might happen if the invention is incorporated into the "coil cord". This invention would be programmed with a set of commands that the data control circuitry would execute when called out by a command module. Although a finite set of commands are explained here, this does in no way limit the commands to this subset. Commands could be added, subtracted, altered, or customized and still be within the scope of this invention. Although the SMART560 is used in this command set explanation, it is assumed that the same commands could be used with a SMARTMOD and/or a SMARTCOIL. A sample of one possible command set is given below:

| Command | Action |
|---|---|
| '?' | (Question) Pass first 3 bytes, −1 from fourth byte |
| 'G' | (Global) Global command, pass all bytes unaltered |

| Command | Action |
| --- | --- |
| 'A' | (Answer) Answer a question, pass all bytes unaltered and information is meant for the control module and not for any other component on the power system. |
| 'B' | (Block) Do not pass the data on. |
| 'R' | (Reprogram) Reprogram ID numbers of the PSCDs that are on this sub-net. |
| 'P' | (Block Power) Block power from passing through SMART560 |
| 'p' | (Connect Power) Pass power through SMART560 |
| 'S' | (SMART ID ON) Enable SMART560 ID numbers for applications that require the SMART560 to have an ID code |
| 's' | (SMART ID OFF) Disable SMART560 ID numbers for applications that do not require the SMART560 to have an ID code. |
| 'D' | (DEFAULT 560) Restore factory default settings of SMART560. |
| 'd' | (DEFAULT PSCD) Restore factory default settings of all PSCDs. |
| '1' | (Priority) Highest priority, save commands that are currently on the system and pass this command first. When this priority command is finished, resume communications where they were interrupted. |

It should be noted that this embodiment is one of many that can be used to implement and practice this invention and other methods may be employed to achieve similar results. These other methods are within the scope of this invention and include connecting and disconnecting the power to the trailers in a manner prescribed by the SMART560, SMARTMOD, and/or SMARTCOIL or commands sent to the SMART560, SMARTMOD, and/or SMARTCOIL from one or more control modules. The SMART560, SMARTMOD, and/or SMARTCOIL and control module working independently or in conjunction may reprogram the sensor ID codes on the trailer it is controlling.

Figure 10:
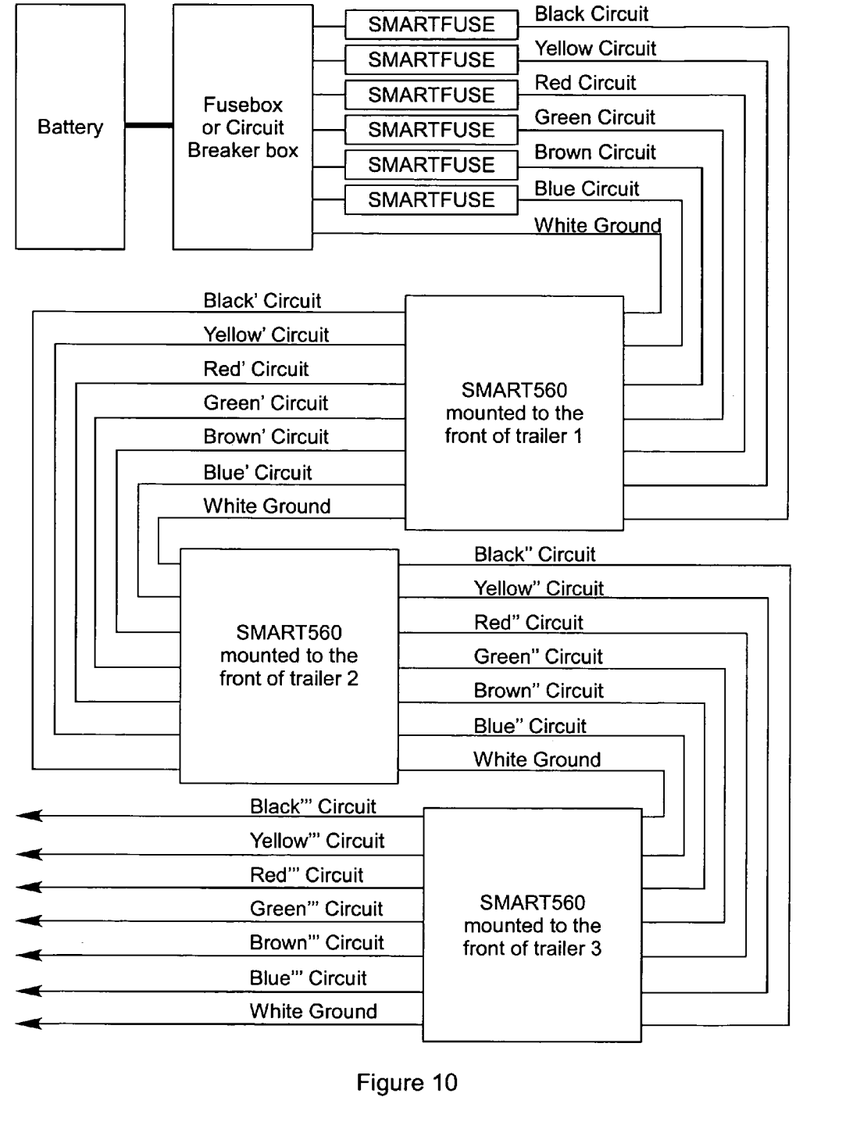
FIG. 10 shows a block diagram of a truck and three trailers and an embodiment that generates 36 unique sub-nets.

FIG. 10 shows a block diagram of a tractor and three trailers utilizing the combined embodiments of FIGS. 2 and 8. The tractor is equipped with a series of fuse box filters to isolate the data on the colored power lines that will be passed to the trailers in tow. These isolated data power lines in the trailer are referred to as the Black Circuit, Yellow Circuit, Red Circuit, Green Circuit, Brown Circuit, Blue Circuit and the White ground. Once these isolated data circuits pass through the first SMART560, they are further isolated from each other. The Black circuit's data is isolated from the Black' Circuit, the Yellow Circuit's data is isolated from the Yellow' Circuit, and so on. This converts 6 isolated data buses into 12 isolated buses. This set of isolated buses is indicated by a prime (') next to each of the colors. The SMART560 has the ability to bridge the isolated circuits together in order to transmit or alter and then transmit data from one isolated data bus to another. The process is repeated when the data is passed through another SMART560 on the front of the second trailer, thus increasing the number of isolated buses to 18. This set of isolated buses is indicated by a double prime ('') next to each of the colors. The process is repeated when the data is passed through yet another SMART560 on the front of the third trailer, thus increasing the number of isolated buses to 24. This set of isolated buses is indicated by a triple prime (''') next to each of the colors.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. In an electrical system for a truck or like vehicle comprising one or more power lines containing one or more power line data receivers and transmitters, the improvement wherein a power line data filter is incorporated in at least one power line carrying data, such that data is blocked from passing through the data filter at all times, said data filter isolating data on one segment of the power line from data on the other segment of the same power line, such that each isolated data segment has the ability to transmit and receive unique data independently from the other isolated data segment of the same power line.

2. The invention of claim 1 wherein said data filter isolates or connects power on both sides of said filter.

3. The invention of claim 1 wherein one or more power line data transmitters and receivers are connected to both segments on each side of said data filter.

4. The invention of claim 3 wherein data control circuitry is connected to the power line data transmitters and receivers on the isolated data segments on each side of said filter.

5. The invention of claim 4 wherein said data control circuitry is connected to said data filter for the control of power flow through the filter.

6. The invention of claim 4 wherein said data control circuitry includes a microprocessor.

7. The invention of claim 3 wherein the data control circuitry is connected to data control circuitry on another power line.

8. In an electrical system for a truck or like vehicle comprising one or more power lines containing one or more power line data transmitters and receivers, the improvement wherein an intelligent isolation module is incorporated into a power line that is carrying data, said intelligent isolation module containing a data filter that isolates data on one segment of the power line from the data on another segment on the same power line, said intelligent isolation module containing two or more power line data transmitters and receivers connected to the isolated data segments on the power line, said intelligent isolation module further containing data control circuitry connected to the power line data transmitters and receivers so as to allow data to be passed from one segment to another segment.

9. The invention of claim 8 wherein the data received by a power line data transmitter and receiver on one isolated data segment is passed to the data control circuitry and said data control circuitry passes the data unaltered to the power line data transmitter and receiver on the other isolated data segment.

10. The invention of claim 8 wherein the data received by a power line data transmitter and receiver on one isolated data segment is passed to the data control circuitry and said data control circuitry alters and passes the data to the power line data transmitter and receiver on the other isolated data segment.

11. The invention of claim 8 wherein the data received on one isolated data segment is passed to the data control circuitry and said data control circuitry blocks the data so the data is not transmitted on the other isolated data segment.

12. The invention of claim 8 wherein the data received on one isolated data segment is passed to the data control circuitry and said data control circuitry passes the data unaltered to the data control circuitry of a different intelligent isolation module on a different power line.

13. The invention of claim 8 wherein the data received on one isolated data segment is passed to the data control circuitry and said data control circuitry alters and passes the data to the data control circuitry of a different intelligent isolation module on a different power line.

14. The invention of claim 8 wherein two or more intelligent isolation modules are connected together so that data can be transmitted between said intelligent isolation modules.

15. The invention of claim 8 wherein the data received on one isolated data segment is passed to the data control circuitry and said data control circuitry disconnects the power passing through the data filter connecting the two isolated data segment.

16. The invention of claim 8 wherein the data received on one isolated data segment is passed to the data control circuitry, said received data containing embedded commands to direct the transmission of power and/or data.

17. The invention of claim 8 wherein independent data is transmitted over both isolated data segments at the same time.

18. The invention of claim 8 wherein the data control circuitry acts as a bi-directional gate to allow data to be passed back and forth between the two isolated data segments on either side of the data filter.

19. In an electrical system for a truck or like vehicle containing one or more power lines wherein data is being transmitted over one or more power lines of said vehicle, the improvement wherein one or more data filters are incorporated into said power line to isolate data on one segment of the power line from another segment of the same power line, wherein each filter has power line data transmitter and receiver on each side of the filter and data control circuitry, where said data control circuitry acts as a bi-directional data gate between the isolated power line segments on either side of said filter.

20. The invention of claim 19 wherein the data received by a power line data transmitter and receiver on one isolated data segment is passed to the data control circuitry and said data control circuitry, acting as a bi-directional gate, passes unaltered data to the power line data transmitter and receiver on the other isolated data segment.

21. The invention of claim 19 wherein the data received by a power line data transmitter and receiver on one isolated data segment is passed to the data control circuitry and the data control circuitry, acting as a bi-directional gate, passes altered data to the power line data transmitter and receiver on the other isolated data segment.

22. The invention of claim 19 wherein the data received on one isolated data segment is blocked and not transmitted on the other isolated data segment.

23. The invention of claim 19 wherein the data received on one isolated data segment is transmitted to a different intelligent isolation module on a different power line.

24. The invention of claim 19 wherein two or more intelligent isolation modules are connected together so that data can be transmitted between said intelligent isolation modules.

25. The invention of claim 19 wherein independent data is transmitted over both segments at the same time.

* * * * *